2 Sheets—Sheet 1.
T. J. WHITEHEAD.
COOKING RANGE.
No. 184,810. Patented Nov. 28, 1876.
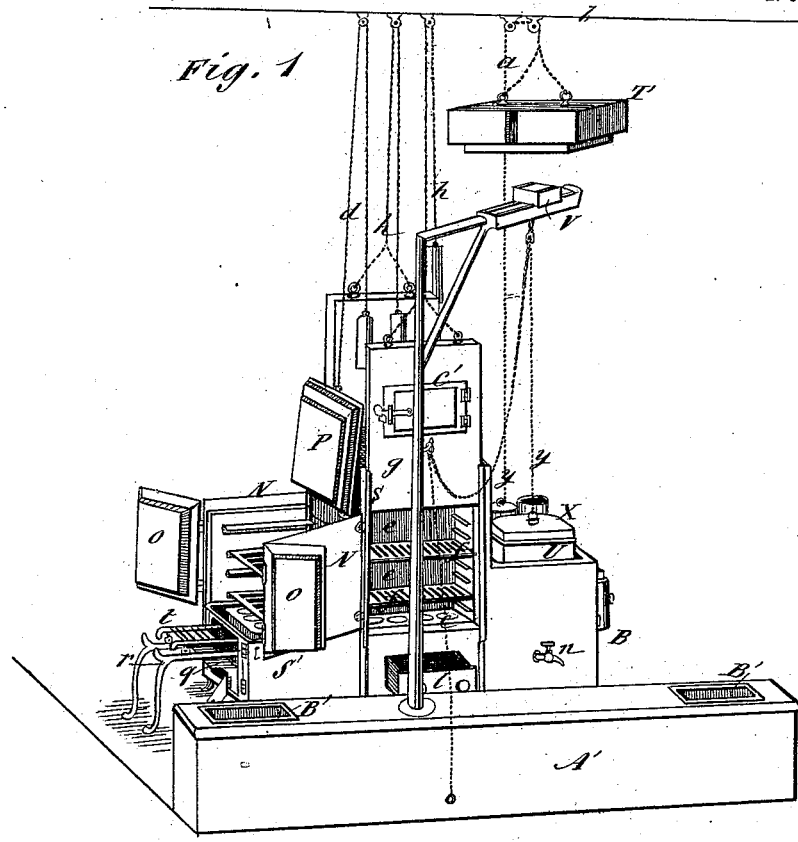
Fig. 1
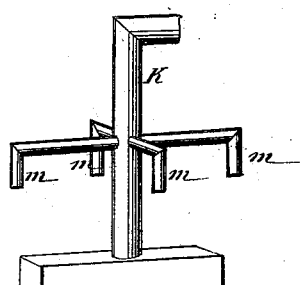
Fig. 2
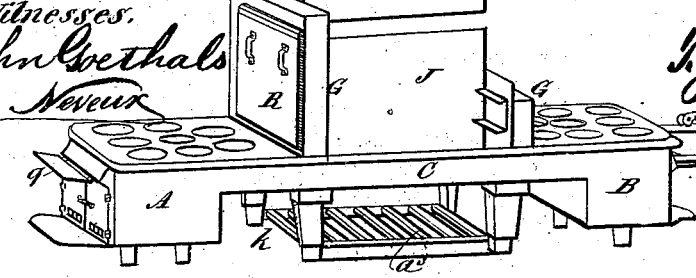
Witnesses: John Goethals, C. Neveux
Inventor: T. J. Whitehead
By — Attorneys
N. PETERS, PHOTO-LITHOGRAPHER, WASHINGTON, D. C.

2 Sheets—Sheet 2.

T. J. WHITEHEAD.
COOKING RANGE.

No. 184,810. Patented Nov. 28, 1876.

WITNESSES:
C. Neveux
John Goethals

INVENTOR:
T. J. Whitehead
BY
ATTORNEYS.

UNITED STATES PATENT OFFICE.

THOMAS J. WHITEHEAD, OF SOUTH PARIS, MAINE.

IMPROVEMENT IN COOKING-RANGES.

Specification forming part of Letters Patent No. 184,810, dated November 28, 1876; application filed May 16, 1876.

*To all whom it may concern:*

Be it known that I, THOMAS J. WHITEHEAD, of South Paris, in the county of Oxford, and State of Maine, have invented a new and Improved Cooking-Range, of which the following is a specification:

The object of this invention is to furnish a cooking apparatus for hotels, restaurants, public and private institutions, steamships, &c., that can be effectually operated with great economy in fuel and labor, and will possess very convenient facilities for cooking and preparing all kinds of food for the table in all methods in ordinary use, such as baking, boiling, roasting, broiling, frying, and steaming, and having hot-water and hot-closet attachments, also contrivances to protect the cooks from the annoyance and suffering from intense heat to which they are ordinarily subjected with the common ranges now in use, and also having at the same time facilities to make the cooks comfortable in cold weather. In this case, as in that for which a patent was granted to me February 3, 1874, the range is in a double-walled casing or air-chamber, with doors and lids, affording access to the range, but this is designed to have greatly-increased facilities for cooking on a large scale, and possesses several new features, all as hereinafter described.

Figure 3:
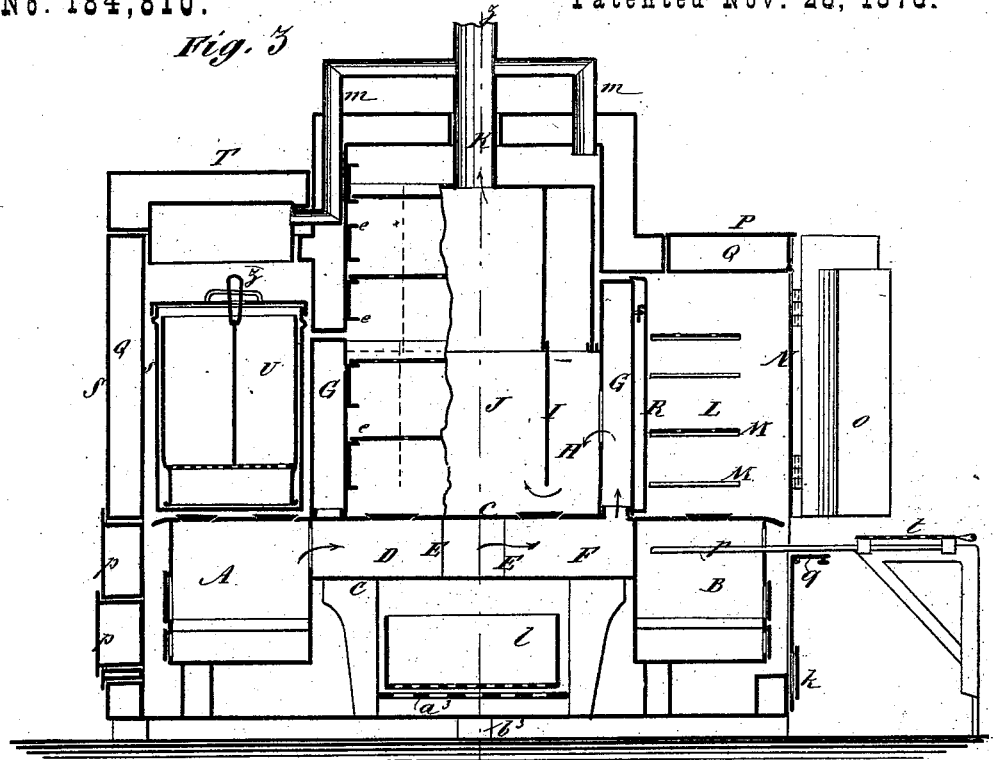
Figure 4:
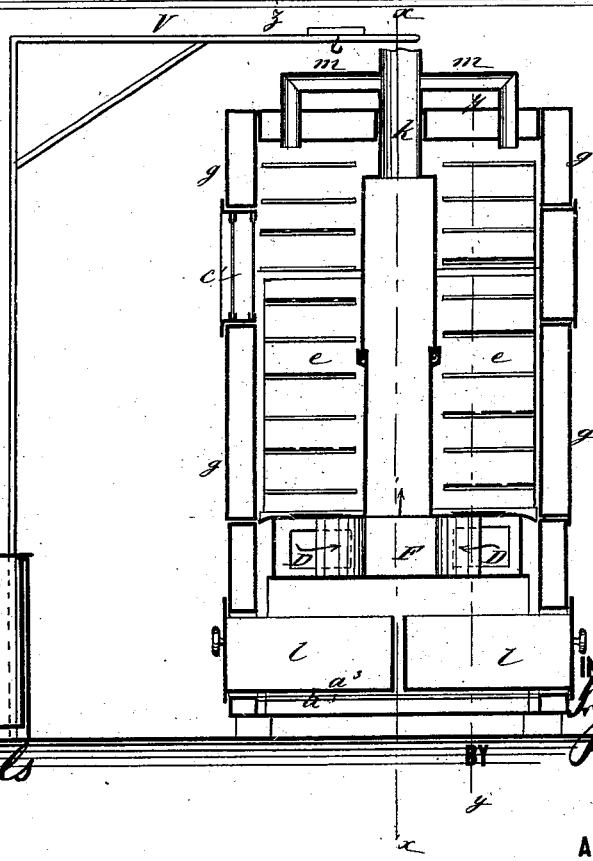

Figure 1 is a perspective view of my improved cooking-range. Fig. 2 is a perspective view of the range and flues, without the inclosing-case. Fig. 3 is a longitudinal sectional elevation, taken on lines $x\ x$ and $y\ y$ of Fig. 4. Fig. 4 is a transverse section on line $z\ z$, Fig. 3.

Similar letters of reference indicate corresponding parts.

A and B represent two fire-boxes, being one at each end of the range, of which C is the intermediate flue portion, into which the products of combustion pass along flues D, to the middle, when they turn around the dividing-plates E, and return through flues F to the upright flues G, from which they pass into the dividing-flues H, under dividing-plates I, into the center flue J, having the smoke-pipe K attached to the top. Over fire-pot B is a cooking-chamber, L, containing shelves for holding baking-pans, and the like, or to have hooks for hanging meat, poultry, &c., for cooking, said chamber being inclosed by the double-walled folding doors N O, and the hinged lid P, containing air-spaces Q. The shelves are removable, and the doors swing open to afford access to the cooking top of the fire-box when required, and when so used the non-radiating screen R, of galvanized iron or other suitable non-conductor, is hung on in front of the flue G, to protect the cook from the heat, which radiates powerfully therefrom to heat the cooking-chamber, when the screen is not applied. The other fire-box is inclosed by permanent double walls S, and removable top T, to be used for boiling, but more particularly steaming, purposes, the boilers U being hoisted in and out at the top by a crane, V, with a traveler, W, to which the boilers are connected by their handles Z, and a hoisting-chain, Y. The covers X will also be lifted on and off in the same way. The top T is lifted off by a chain, $a$, suspended from the ceiling $b$. The hinged lid P, of the other side, has a counterbalanced chain, $d$, depending from the ceiling to assist in raising it. On each side of the flues J is an oven, $e$, containing removable shelves $f$, and being closed by a vertically-sliding door, $g$, which is raised and lowered by a counterbalanced chain, $h$, and the range-top C has pot-holes in these ovens. Below the middle portion of the range is a hot-closet, $k$, in which a drawer, $l$, is inserted from each side, said drawers having open bottoms, and being on open supporting-plates $a^3$, to allow the air to pass up inside of the inclosing-case from the inlet-pipe $b^3$, to ventilate the ovens and cooking-spaces by escaping through pipes $m$ into the smoke-pipe K. The case surrounding the steaming fire-box will have a faucet, $n$, with suitable connection to the boiler for hot water inside, to draw it conveniently when required. Such faucets may be attached to the cooking-pots, to draw off the liquor when required. The inclosing-case, and also the case S' below the doors N O, have suitable openings $p$ for putting in fuel, removing ashes, &c., and at $q$ is a drop-door, for the temporary application of a broiler-stand, $r$, on which to run a large broiler, $t$, into the fire-box, above the fire-bed, for broiling.

A' is a table or counter, containing sinks B', and being located at one side of the range a suitable distance, for preparing the dishes ready for taking up by the crane, and for receiving them from the range. Small windows C', of transparent material, will be made in the oven-doors, through which to inspect the operations without opening the large doors, and others will be put in top or other sides for admitting the light, to enable the cook to see the inside clearly. The flues G, which are oblong, are arranged crosswise of the range, to heat the cooking-chambers and the ovens e. On the other hand, the flues J, which are of the same form, are arranged lengthwise of the range along the middle, between flues G, and at right angles to them, to heat the ovens e, and to divide them from each other. When the insulating-case is closed the heat is entirely shut in, making the room or kitchen cool and comfortable; but in colder weather the case may be opened more or less.

In some cases I propose to make the sliding doors g shorter—for instance, in buildings not having sufficiently-high ceilings—and in that case will have a similar drawer above the top of the middle part C of the range.

Having thus described my invention, I claim as new and desire to secure by Letters Patent—

1. The combination, in a cooking-range, of two end fire-boxes, A B, and a middle portion, C, inclosed in a heat-insulator, substantially as specified.

2. The combination of flues G and J, fire-boxes A B, and intermediate flue C, substantially as specified.

3. The combination of flues G and J, inclosed cooking-chambers L, and ovens e, substantially as specified.

4. The combination of the screen R with flue G, substantially as specified.

5. The combination, with the range, of the broiler-stand r, and sliding or rolling broiler t thereon, substantially as specified.

6. The combination of the table A', crane V, and the range, substantially as specified.

THOMAS J. WHITEHEAD.

Witnesses:
 T. B. MOSHER,
 ALEX. F. ROBERTS.